(12) United States Patent
Wang et al.

(10) Patent No.: US 12,039,458 B2
(45) Date of Patent: Jul. 16, 2024

(54) SYSTEM, METHOD, AND COMPUTER PROGRAM PRODUCT FOR INCORPORATING KNOWLEDGE FROM MORE COMPLEX MODELS IN SIMPLER MODELS

(71) Applicant: Visa International Service Association, San Francisco, CA (US)

(72) Inventors: Liang Wang, San Jose, CA (US); Xiaobo Dong, Champaign, IL (US); Robert Christensen, San Francisco, CA (US); Liang Gou, San Jose, CA (US); Wei Zhang, Fremont, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 1142 days.

(21) Appl. No.: 16/244,240

(22) Filed: Jan. 10, 2019

(65) Prior Publication Data

US 2020/0226476 A1 Jul. 16, 2020

(51) Int. Cl.
*G06N 3/08* (2023.01)
*G06N 3/045* (2023.01)
*G06N 5/02* (2023.01)
*G06Q 30/018* (2023.01)

(52) U.S. Cl.
CPC .............. *G06N 5/02* (2013.01); *G06N 3/045* (2023.01); *G06N 3/08* (2013.01); *G06Q 30/0185* (2013.01)

(58) Field of Classification Search
CPC .......... G06N 5/02; G06N 3/0454; G06N 3/08; G06Q 30/0185
See application file for complete search history.

(56) References Cited

U.S. PATENT DOCUMENTS

| | | | |
|---|---|---|---|
| 10,824,940 B1* | 11/2020 | Rybakov | G06N 7/01 |
| 2018/0032871 A1 | 2/2018 | Holt et al. | |
| 2018/0158552 A1 | 6/2018 | Liu et al. | |
| 2018/0365564 A1* | 12/2018 | Huang | G06N 3/04 |
| 2019/0228397 A1* | 7/2019 | Madden | G06Q 20/387 |
| 2020/0210849 A1* | 7/2020 | Ben Kimon | G06N 3/0454 |

(Continued)

FOREIGN PATENT DOCUMENTS

CN 108920622 A 11/2018

OTHER PUBLICATIONS

Bengio, "Learning Deep Architectures for AI", Foundations and Trends in Machine Learning, 56 pages.

(Continued)

*Primary Examiner* — Li B. Zhen
*Assistant Examiner* — Moriam Mosunmola Godo
(74) *Attorney, Agent, or Firm* — The Webb Law Firm

(57) ABSTRACT

A system, method, and computer program product for incorporating knowledge from more complex models in simpler models. A method may include obtaining first training data associated with a first set of features and second training data associated with a second set of features different than the first set of features; training a first model based on the first training data and the second training data; and training a second model, using a loss function that depends on an output of an intermediate layer of the first model and an output of the second model, based on the second training data.

20 Claims, 6 Drawing Sheets

(56) References Cited

U.S. PATENT DOCUMENTS

2020/0257964 A1* 8/2020 Caelen ............... G06N 3/0472

OTHER PUBLICATIONS

Bucila et al., "Model Compression", Proceedings of the 12th ACM SIGKDD International Conference on Knowledge Discovery and Data Mining, 2006, 7 pages.

Goodman et al., "European Union regulations on algorithmic decision-making and a 'right to explanation'", https://arxiv.org/abs/1606.08813, Aug. 31, 2016, 9 pages.

Hinton et al., "Distilling the Knowledge in a Neural Network", Deep Learning and Representation Learning Workshop, NIPS, 2014, 9 pages.

Hochreiter et al., "Long Short-Term Memory", Neural Computation 1997, vol. 9(8), pp. 1735-1780.

Holloway, "Introduction to Ensemble Learning Featuring Successes in the Netflix Prize Competition", https://pdfs.semanticscholar.org/presentation/959f/6ddd58779b5130c65b888fa1e3f6347ebd72.pdf, 2007, 32 pages.

Johnston, "Netflix Never Used its $1 Million Algorithm Due to Engineering Costs", Wired, Apr. 16, 2012, 9 pages.

Mikolov et al., "Distributed Representations of Words and Phrases and their Compositionality", Proceedings of the 26th International Conference on Neural Information Processing Systems (NIPS), 2013, pp. 3111-3119.

Ribeiro et al., "'Why Should I Trust You?' Explaining the Predictions of Any Classifier", Knowledge Discovery and Data Mining (KDD), Aug. 9, 2016, 10 pages.

Siddiqi, "Credit Risk Scorecards: Developing and Implementing Intelligent Credit Scoring", John Wiley & Sons, 2006, 13 pages.

Szegedy et al., "Going deeper with convolutions", Proceedings of IEEEConference on Computer Vision and Pattern Recognition, 2015, pp. 1-9.

Yang et al., "Breaking the Softmax Bottleneck: A High-Rank RNN Language Model", International Conference on Learning Representations, 2018, 18 pages.

Jurgovsky et al., "Sequence Classification for Credit-Card Fraud Detection", Expert Systems with Applications, 2018, pp. 1-12.

Romero et al., "FitNets: Hints for Thin Deep Nets", ICLR, 2015, pp. 1-13.

* cited by examiner

SYSTEM, METHOD, AND COMPUTER PROGRAM PRODUCT FOR INCORPORATING KNOWLEDGE FROM MORE COMPLEX MODELS IN SIMPLER MODELS

BACKGROUND

1. Field

This disclosure relates generally to incorporating knowledge from more complex models in simpler models and, in some embodiments or aspects, to a system, a method, and a computer program product for training, providing, and/or using a prediction model that incorporates knowledge from a more complex model.

2. Technical Considerations

Existing risk or fraud detection models used in the payment industry use relatively simpler models, such as logistic regressions, decision trees, feedforward neural networks, and/or the like. For example, the Falcon® fraud detection model, developed by data analytics company FICO and deployed by payment data processors and issuing banks worldwide, uses a feedforward neural network that provides a relatively simple analytic model architecture with a focus on efficiency, low latency, and low memory footprint.

Existing simpler models may be easier to train and/or maintain than more complex models. For example, once trained, an existing simpler model typically uses a smaller memory footprint and less computational resources at runtime, which makes such an existing simpler model well-suited for deployment to a large number of users that may have more stringent requirements on latency and computational resource usage. As an example, latency and computational resource usage requirements may be particularly stringent in the payment industry, in which predictive models influence millions of consumers and are used to make decisions in real-time.

Existing simpler models may also be easier to interpret than more complex models. For example, model interpretability may be used in assessing trust associated with a prediction of a model. Existing risk or fraud detection models deployed in the payment industry may use many hand-crafted features that incorporate knowledge of domain experts that has been collected over the years. These existing risk or fraud detection models are typically relatively easy to explain and well accepted by users. For example, taking an action based on a prediction from a model can become a liability in financial decisions involving consumer rights, such as credit assessments, risk assessments, and/or the like, and an interpretability of the model may affect whether the model is used in such financial decision making. As an example, an effect of model interpretability can be seen in the General Data Protection Regulation (GDPR) issued by the European Union, which took effect as law across the European Union in May 2018 and creates a "right of explanation" whereby a consumer can ask for an explanation of an algorithmic decision that was made about the consumer.

However, existing simpler models may have inherent limitations. For example, because of more stringent requirements on latency and computational resources, an existing simpler model may not use too many features and/or complex features regardless of whether such features may be good indicators of risk or fraud. Further, a structure of an existing simpler model has a more limited capacity than a more complex model, which weakens a generalization ability of the existing simpler model. In this way, existing simpler models may fail to capture latent and more sophisticated risky patterns and/or incorrectly decline legitimate transactions, which can lead to revenue loss and/or poor consumer experiences. For example, although major data processors and issuing banks have deployed fraud detection models, such as the Falcon® fraud detection model, to safeguard transactions of consumers, loss due to fraudulent transactions and false declined transactions is relatively large. As an example, on an average in the payment industry, there may be $9 of fraudulent transactions and $520 of declined transactions out of each $10,000 of approved transactions, and a significant portion of the $520 of declined transactions may be false declines.

Deep learning has made a relatively large impact on a wide variety of applications, particularly in the areas of computer vision and speech recognition in which deep neural networks that include multiple layers are used. These existing deep learning models may include millions of parameters and be trained using billions of examples, which can offer larger capacity and better generalization performance that is difficult for existing simpler models to match. An existing ensemble method, in which a set of existing models are combined to make a prediction, can also produce more complex existing models with relatively stronger generalization ability.

However, existing more complex models, despite having relatively stronger generalization performance, are not well-suited for applications with more stringent requirements on latency and computational resource usage. For example, existing more complex models may not be able to generate decisions in real-time. As an example, Netflix awarded a $1 million prize to a developer team in 2009 for an ensemble model that increased the accuracy of the company's recommendation engine by 10 percent, but the engineering blog of Netflix disclosed in 2012 that Netflix never deployed the winning ensemble model in a production system because the increase in accuracy provided by the winning improvements "did not seem to justify the engineering effort needed to bring them into a production environment".

Existing more complex models may also have decreased interpretability. With the involvement of more complex models in decision making, it is more difficult for users to perceive the underlying reasoning process that leads to a decision by the more complex model. However, model interpretation is likely to remain a vital concern in the payment industry for years to come, because if users do not trust a model or the decisions thereof, the users will not implement the model or the decisions thereof.

Accordingly, there is a need in the art to improve a generalization ability of a model while maintaining an ease of deployment and an interpretability of the model.

SUMMARY

Accordingly, provided are systems, methods, and computer program products for improving a generalization ability of a model while maintaining an ease of deployment and an interpretability of the model by incorporating knowledge from more complex models in simpler models.

According to some non-limiting embodiments or aspects, provided is a computer-implemented method comprising: obtaining, with at least one processor, first training data associated with a first set of features and second training data associated with a second set of features different than the first set of features; training, with at least one processor, a first model based on the first training data and the second training data; and training, with at least one processor, a second model, using a loss function that depends on an output of an intermediate layer of the first model and an output of the second model, based on the second training data.

In some non-limiting embodiments or aspects, the second model includes at least one first layer and at least one second layer, the output of the second model includes an output of the at least one first layer, and training the second model further comprises: modifying, using the loss function that depends on the output of the intermediate layer of the first model and the output of the second model including the output of the first layer, one or more parameters of the at least one first layer of the second model; and training the at least one second layer based on the output of the at least one first layer.

In some non-limiting embodiments or aspects, the first model includes at least one of the following: a deep neural network, a recurrent neural network, an ensemble of a plurality of neural networks, or any combination thereof, the first layer of the second model includes a regression neural network, and the second layer of the second model includes a logistic regression model.

In some non-limiting embodiments or aspects, the method further comprises: determining, with at least one processor, a plurality of information values of a plurality of intermediate layers of the first model; and selecting, with at least one processor, the intermediate layer from the plurality of intermediate layers based on the plurality of information values.

In some non-limiting embodiments or aspects, the first set of features includes complex features, and the second set of features includes interpretable features.

In some non-limiting embodiments or aspects, the first model includes a greater number of parameters than the second model.

In some non-limiting embodiments or aspects, the method further comprises: providing, with at least one processor, the trained second model; obtaining, with at least one processor, input data associated with at least one transaction; and processing, with at least one processor and using the trained second model, the input data to generate output data, the output data including a prediction of whether the at least one transaction is a fraudulent transaction.

According to some non-limiting embodiments or aspects, provided is a computing system comprising at least one processor programmed and/or configured to: obtain first training data associated with a first set of features and second training data associated with a second set of features different than the first set of features; train a first model based on the first training data and the second training data; and train a second model, using a loss function that depends on an output of an intermediate layer of the first model and an output of the second model, based on the second training data.

In some non-limiting embodiments or aspects, the second model includes at least one first layer and at least one second layer, the output of the second model includes an output of the at least one first layer, and the at least one processor is further programmed and/or configured to train the second model by: modifying, using the loss function that depends on the output of the intermediate layer of the first model and the output of the second model including the output of the first layer, one or more parameters of the at least one first layer of the second model; and training the at least one second layer based on the output of the at least one first layer.

In some non-limiting embodiments or aspects, the first model includes at least one of the following: a deep neural network, a recurrent neural network, an ensemble of a plurality of neural networks, or any combination thereof, the first layer of the second model includes a regression neural network, and the second layer of the second model includes a logistic regression model.

In some non-limiting embodiments or aspects, the at least one processor is further programmed and/or configured to: determine a plurality of information values of a plurality of intermediate layers of the first model; and select the intermediate layer from the plurality of intermediate layers based on the plurality of information values.

In some non-limiting embodiments or aspects, the first set of features includes complex features, and the second set of features includes interpretable features.

In some non-limiting embodiments or aspects, the first model includes a greater number of parameters than the second model.

In some non-limiting embodiments or aspects, the at least one processor is further programmed and/or configured to: provide the trained second model; obtain input data associated with at least one transaction; and process, using the trained second model, the input data to generate output data, the output data including a prediction of whether the at least one transaction is a fraudulent transaction.

According to some non-limiting embodiments or aspects, provided is a computer program product comprising at least one non-transitory computer-readable medium including program instructions that, when executed by at least one processor, cause the at least one processor to: obtain first training data associated with a first set of features and second training data associated with a second set of features different than the first set of features; train a first model based on the first training data and the second training data; and train a second model, using a loss function that depends on an output of an intermediate layer of the first model and an output of the second model, based on the second training data.

In some non-limiting embodiments or aspects, the second model includes at least one first layer and at least one second layer, the output of the second model includes an output of the at least one first layer, and the instructions further cause the at least one processor to train the second model by: modifying, using the loss function that depends on the output of the intermediate layer of the first model and the output of the second model including the output of the first layer, one or more parameters of the at least one first layer of the second model; and training the at least one second layer based on the output of the at least one first layer.

In some non-limiting embodiments or aspects, the instructions further cause the at least one processor to: determine a plurality of information values of a plurality of intermediate layers of the first model; and select the intermediate layer from the plurality of intermediate layers based on the plurality of information values.

In some non-limiting embodiments or aspects, the first set of features includes complex features, and the second set of features includes interpretable features.

In some non-limiting embodiments or aspects, the first model includes a greater number of parameters than the second model.

In some non-limiting embodiments or aspects, the instructions further cause the at least one processor to: provide the trained second model; obtain input data associated with at least one transaction; and process, using the trained second model, the input data to generate output data, the output data including a prediction of whether the at least one transaction is a fraudulent transaction.

Further embodiments or aspects are set forth in the following numbered clauses:

Clause 1. A computer-implemented method comprising: obtaining, with at least one processor, first training data associated with a first set of features and second training data associated with a second set of features different than the first set of features; training, with at least one processor, a first model based on the first training data and the second training data; and training, with at least one processor, a second model, using a loss function that depends on an output of an intermediate layer of the first model and an output of the second model, based on the second training data.

Clause 2. The computer-implemented method of clause 1, wherein the second model includes at least one first layer and at least one second layer, wherein the output of the second model includes an output of the at least one first layer, and wherein training the second model further comprises: modifying, using the loss function that depends on the output of the intermediate layer of the first model and the output of the second model including the output of the first layer, one or more parameters of the at least one first layer of the second model; and training the at least one second layer based on the output of the at least one first layer.

Clause 3. The computer-implemented method of clauses 1 or 2, wherein the first model includes at least one of the following: a deep neural network, a recurrent neural network, an ensemble of a plurality of neural networks, or any combination thereof, wherein the first layer of the second model includes a regression neural network, and wherein the second layer of the second model includes a logistic regression model.

Clause 4. The computer-implemented method of any of clauses 1-3, further comprising: determining, with at least one processor, a plurality of information values of a plurality of intermediate layers of the first model; and selecting, with at least one processor, the intermediate layer from the plurality of intermediate layers based on the plurality of information values.

Clause 5. The computer-implemented method of any of clauses 1-4, wherein the first set of features includes complex features, and wherein the second set of features includes interpretable features.

Clause 6. The computer-implemented method of any of clauses 1-5, wherein the first model includes a greater number of parameters than the second model.

Clause 7. The computer-implemented method of any of clauses 1-6, further comprising: providing, with at least one processor, the trained second model; obtaining, with at least one processor, input data associated with at least one transaction; and processing, with at least one processor and using the trained second model, the input data to generate output data, wherein the output data includes a prediction of whether the at least one transaction is a fraudulent transaction.

Clause 8. A computing system comprising: at least one processor programmed and/or configured to: obtain first training data associated with a first set of features and second training data associated with a second set of features different than the first set of features; train a first model based on the first training data and the second training data; and train a second model, using a loss function that depends on an output of an intermediate layer of the first model and an output of the second model, based on the second training data.

Clause 9. The computing system of clause 8, wherein the second model includes at least one first layer and at least one second layer, wherein the output of the second model includes an output of the at least one first layer, and wherein the at least one processor is further programmed and/or configured to train the second model by: modifying, using the loss function that depends on the output of the intermediate layer of the first model and the output of the second model including the output of the first layer, one or more parameters of the at least one first layer of the second model; and training the at least one second layer based on the output of the at least one first layer.

Clause 10. The computing system of clauses 8 or 9, wherein the first model includes at least one of the following: a deep neural network, a recurrent neural network, an ensemble of a plurality of neural networks, or any combination thereof, wherein the first layer of the second model includes a regression neural network, and wherein the second layer of the second model includes a logistic regression model.

Clause 11. The computing system of any of clauses 8-10, wherein the at least one processor is further programmed and/or configured to: determine a plurality of information values of a plurality of intermediate layers of the first model; and select the intermediate layer from the plurality of intermediate layers based on the plurality of information values.

Clause 12. The computing system of any of clauses 8-11, wherein the first set of features includes complex features, and wherein the second set of features includes interpretable features.

Clause 13. The computing system of any of clauses 8-12, wherein the first model includes a greater number of parameters than the second model.

Clause 14. The computing system of any of clauses 8-13, wherein the at least one processor is further programmed and/or configured to: provide the trained second model; obtain input data associated with at least one transaction; and process, using the trained second model, the input data to generate output data, wherein the output data includes a prediction of whether the at least one transaction is a fraudulent transaction.

Clause 15. A computer program product comprising at least one non-transitory computer-readable medium including program instructions that, when executed by at least one processor, cause the at least one processor to: obtain first training data associated with a first set of features and second training data associated with a second set of features different than the first set of features; train a first model based on the first training data and the second training data; and train a second model, using a loss function that depends on an output of an intermediate layer of the first model and an output of the second model, based on the second training data.

Clause 16. The computer program product of clause 15, wherein the second model includes at least one first layer and at least one second layer, wherein the output of the second model includes an output of the at least one first layer, and wherein the instructions further cause the at least one processor to train the second model by: modifying, using the loss function that depends on the output of the intermediate layer of the first model and the output of the second model including the output of the first layer, one or more parameters of the at least one first layer of the second model; and training the at least one second layer based on the output of the at least one first layer.

Clause 17. The computer program product of clauses 15 or 16, wherein the instructions further cause the at least one processor to: determine a plurality of information values of a plurality of intermediate layers of the first model; and select the intermediate layer from the plurality of intermediate layers based on the plurality of information values.

Clause 18. The computer program product of any of clauses 15-17, wherein the first set of features includes complex features, and wherein the second set of features includes interpretable features.

Clause 19. The computer program product of any of clauses 15-18, wherein the first model includes a greater number of parameters than the second model.

Clause 20. The computer program product of any of clauses 15-19, wherein the instructions further cause the at least one processor to: provide the trained second model; obtain input data associated with at least one transaction; and process, using the trained second model, the input data to generate output data, wherein the output data includes a prediction of whether the at least one transaction is a fraudulent transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details of non-limiting embodiments or aspects are explained in greater detail below with reference to the exemplary embodiments that are illustrated in the accompanying schematic figures, in which.

DESCRIPTION

Figure 1:
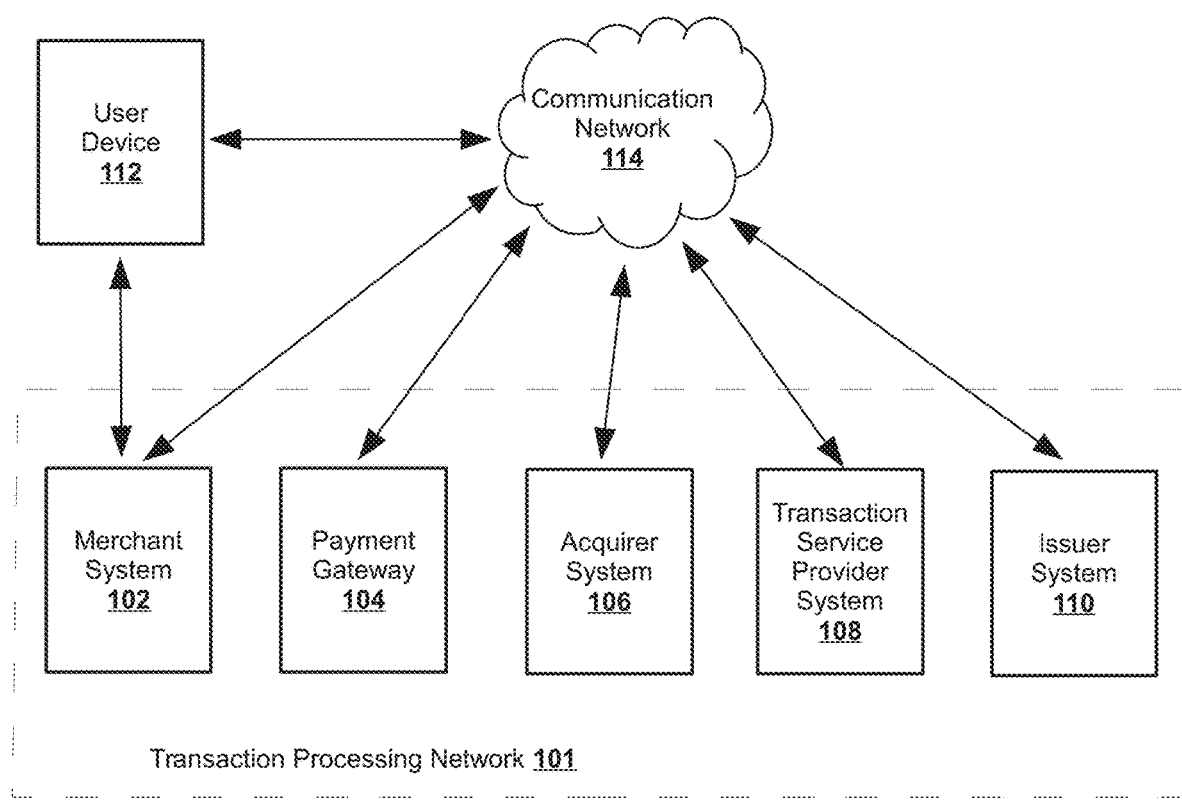
FIG. 1 is a diagram of a non-limiting embodiment or aspect of an environment in which systems, devices, products, apparatus, and/or methods as described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

For purposes of the description hereinafter, the terms "end," "upper," "lower," "right," "left," "vertical," "horizontal," "top," "bottom," "lateral," "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects of the embodiments disclosed herein are not to be considered as limiting unless otherwise indicated.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a portable financial device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computer systems, computer devices, software applications, and/or the like operated by or on behalf of an acquirer institution.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes. The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a security card, a computer, an access card, a wireless terminal, and/or a transponder, and/or the like. In some non-limiting embodiments, the portable financial device may include a volatile or a non-volatile memory to store information, (e.g., an account identifier, a name of the account holder, and/or the like).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

Provided are improved systems, methods, and computer program products for incorporating knowledge from more complex models in simpler models.

Bucila, C., Caruana, R., and Niculescu-Mizil, A., in the paper titled "Model Compression", in Proceedings of the 12th ACM SIGKDD International Conference on Knowledge Discovery and Data Mining, (2006), the entire contents of which is hereby incorporated by reference, describe a "model compression" approach for model training in which knowledge acquired by a more cumbersome or complex model, including a large ensemble of models, can be transferred to a single smaller or simpler model. For example, this existing model compression approach trains a simpler model using an output of a final layer of a more complex model, which is logits input to softmax with a dimension of six rather than probabilities produced by softmax.

Hinton, G., Vinyals, O., and Dean, J., in the paper titled "Distilling the Knowledge in a Neural Network", in Deep Learning and Representation Learning Workshop, (NIPS 2014), the entire contents of which is hereby incorporated by reference, describe a "knowledge distillation" approach for model training to transfer knowledge from a more cumbersome or complex model to a smaller or simpler model. For example, this existing knowledge distillation approach uses a more complex model that includes an ensemble of deep neural network models and trains a simpler neural network model to match an output of a final layer of the more complex model, which is a variant of the class probability produced using softmax with an annealing parameter T. The existing knowledge distillation approach has been shown to perform well in classification tasks that include multiple classes, such as image and speech recognition tasks that typically involve hundreds and/or thousands of classes (e.g., in a speech recognition experiment conducted with the existing knowledge distillation approach softmax contained 14,000 labels).

However, the existing model compression approach and the existing knowledge distillation approach may not perform well on classification tasks typically situated in the payment industry, such as, classification tasks that are binary or include only two values (e.g., approve/reject, fraud/non-fraud, etc.), because use of these existing approaches for such classification tasks results in the use of a lower-dimensional vector associated with the final layer of the more cumbersome or complex model that does not have enough capacity to sufficiently carry the knowledge from the more cumbersome or complex model to a smaller or simpler model. For example, the simpler model may capture only the information provided by true classification labels without learning a finer structure learned by the more complex model. As an example, when a dimension of a feature vector is too small, logits input to softmax and class probability output from softmax do not have the capacity to express a true data distribution. In this way, existing computer systems and approaches to model training have no mechanism for training a simpler model using a loss function that depends directly on an output of an intermediate layer of a more complex model. For example, existing computer systems and approaches to model training have no mechanism for carrying or transferring a true data distribution from a more complex model to a simpler model for classification tasks that are binary or include only two values. Accordingly, existing computer systems and approaches to model training do not perform well on classification tasks typically situated in the payment industry and that are binary or include only two values (e.g., approve/reject, fraud/non-fraud, etc.).

Non-limiting embodiments or aspects of the present disclosure are directed to systems, methods, and computer program products for training, providing, and/or using a prediction model that incorporates knowledge from a more complex model by obtaining first training data associated with a first set of features and second training data associated with a second set of features different than the first set of features; training a first model based on the first training data and the second training data; and training a second model, using a loss function that depends on an output of an intermediate layer of the first model and an output of the second model, based on the second training data.

In this way, embodiments or aspects of the present disclosure may provide for training a simpler model using a loss function that depends directly on an output of an intermediate layer of a more complex model, which can provide for (i) a simpler model learning a finer structure learned by the more complex model; (ii) better model performance on classification tasks typically situated in the payment industry, such as, classification tasks that are binary or include only two values (e.g., approve/reject, fraud/non-fraud, etc.); (iii) improving a generalization ability of a model while maintaining an ease of deployment and an interpretability of the model without requiring payment data processors and/or issuing banks to alter existing system architectures and data feeds to accommodate a more complex model; and/or the like.

Referring now to FIG. 1, FIG. 1 is a diagram of an example environment 100 in which devices, systems, methods, and/or products described herein, may be implemented. As shown in FIG. 1, environment 100 includes transaction processing network 101, which can include merchant system 102, payment gateway 104, acquirer system 106, transaction service provider system 108, and/or issuer system 110, user device 112, and/or communication network 114. Transaction processing network 101, merchant system 102, payment gateway 104, acquirer system 106, transaction service provider system 108, issuer system 110, and/or user device 112 may interconnect (e.g., establish a connection to communicate) via wired connections, wireless connections, or a combination of wired and wireless connections.

Merchant system 102 may include one or more devices capable of receiving information from payment gateway 104, acquirer system 106, transaction service provider system 108, issuer system 110, and/or user device 112 via communication network 114 and/or communicating information to payment gateway 104, acquirer system 106, transaction service provider system 108, issuer system 110, and/or user device 112 via communication network 114. Merchant system 102 may include a device capable of receiving information from user device 112 via a communication connection (e.g., an NFC communication connection, an RFID communication connection, a Bluetooth® communication connection, and/or the like) with user device 112, and/or communicating information to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway 104 may include one or more devices capable of receiving information from merchant system 102, acquirer system 106, transaction service provider system 108, issuer system 110, and/or user device 112 via communication network 114 and/or communicating information to merchant system 102, acquirer system 106, transaction service provider system 108, issuer system 110, and/or user device 112 via communication network 114. For example, payment gateway 104 may include a computing device, such as a server, a group of servers, and/or other like devices. In some non-limiting embodiments or aspects, payment gateway 104 is associated with a payment gateway as described herein.

Acquirer system 106 may include one or more devices capable of receiving information from merchant system 102, payment gateway 104, transaction service provider system 108, issuer system 110, and/or user device 112 via communication network 114 and/or communicating information to merchant system 102, payment gateway 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information from merchant system 102, payment gateway 104, acquirer system 106, issuer system 110, and/or user device 112, via communication network 114 and/or communicating information to merchant system 102, payment gateway 104, acquirer system 106, issuer system 110, and/or user device 112 via communication network 114. For example, transaction service provider system 108 may include a computing device, such as a server (e.g., a transaction processing server), a group of servers, and/or other like devices. In some non-limiting embodiments or aspects, transaction service provider system 108 may be associated with a transaction service provider as described herein.

Issuer system 110 may include one or more devices capable of receiving information from merchant system 102, payment gateway 104, acquirer system 106, transaction service provider system 108, and/or user device 112 via communication network 114 and/or communicating information to merchant system 102, payment gateway 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway 104, acquirer system 106, transaction service provider system 108, and/or issuer system 110.

User device 112 may include one or more devices capable of receiving information from merchant system 102, payment gateway 104, acquirer system 106, transaction service provider system 108, and/or issuer system 110 via communication network 114 and/or communicating information to merchant system 102, payment gateway 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102) via a short range wireless communication connection (e.g., an NFC communication connection, an RFID communication connection, a Bluetooth® communication connection, and/or the like), and/or communicating information (e.g., to merchant system 102) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices, systems, and networks shown in FIG. 1 are provided as an example. There may be additional devices, systems, and/or networks, fewer devices, systems, and/or networks, different devices, systems, and/or networks, or differently arranged devices, systems, and/or networks than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices or systems of environment 100.

Figure 2:
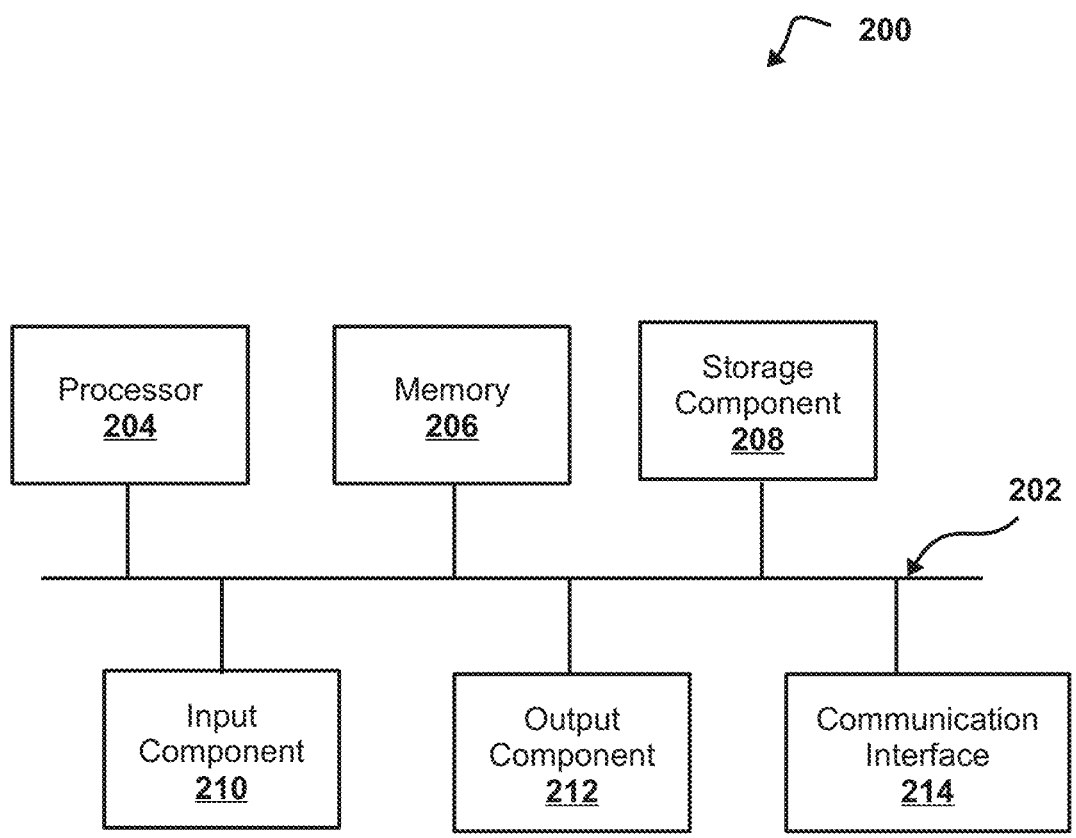
FIG. 2 is a diagram of a non-limiting embodiment or aspect of components of one or more devices and/or one or more systems of FIG. 1.

Referring now to FIG. 2, FIG. 2 is a diagram of example components of a device 200. Device 200 may correspond to one or more devices of transaction processing network 101, one or more devices of merchant system 102, one or more devices of payment gateway 104, one or more devices of acquirer system 106, one or more devices of transaction service provider system 108, one or more devices of issuer system 110, one or more devices of user device 112 and/or one or more devices of communication network 114. In some non-limiting embodiments or aspects, one or more devices of transaction processing network 101, one or more devices of merchant system 102, one or more devices of payment gateway 104, one or more devices of acquirer system 106, one or more devices of transaction service provider system 108, one or more devices of issuer system 110, one or more devices of user device 112 and/or one or more devices of communication network 114 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, an electroencephalogram (EEG) monitor, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, the information may include training data, first training data, second training data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
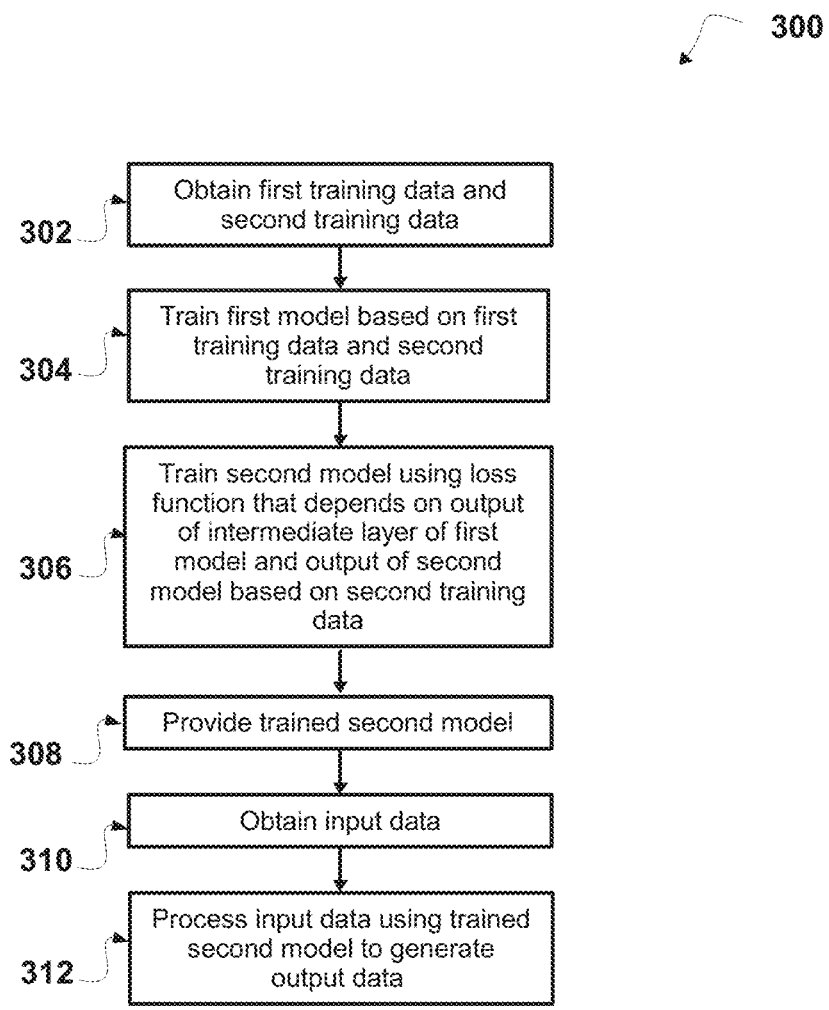
FIG. 3 is a flowchart illustrating a non-limiting embodiment or aspect of a process for training, providing, and/or using a prediction model that incorporates knowledge from a more complex model.

Referring now to FIG. 3, FIG. 3 is a flowchart of a non-limiting embodiment or aspect of a process 300 for training, providing, and/or using a prediction model that incorporates knowledge from a more complex model. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway 104 (e.g., one or more devices of payment gateway 104), acquirer system 106 (e.g., one or more devices of acquirer system 106), issuer system 110 (e.g., one or more devices of issuer system 110), and/or user device 112.

As shown in FIG. 3, at step 302, process 300 includes obtaining first training data and second training data. For example, transaction service provider system 108 may obtain first training data and second training data. As an example, transaction service provider system 108 may obtain first training data (e.g., more complex training data, etc.) associated with a first set of features (e.g., complex features, more complex features, etc.) and second training data (e.g., simpler training data, etc.) associated with a second set of features (e.g., simpler features, interpretable features, etc.) different than the first set of features. In some non-limiting embodiments or aspects, first training data and/or second training data may be determined based on parameters of transactions stored in transaction data logs or a database.

In some non-limiting embodiments or aspects, the first set of features includes a greater number of features than the second set of features. In some non-limiting embodiments or aspects, the first set of features includes complex features and the second set of features includes interpretable features.

Figure 4:
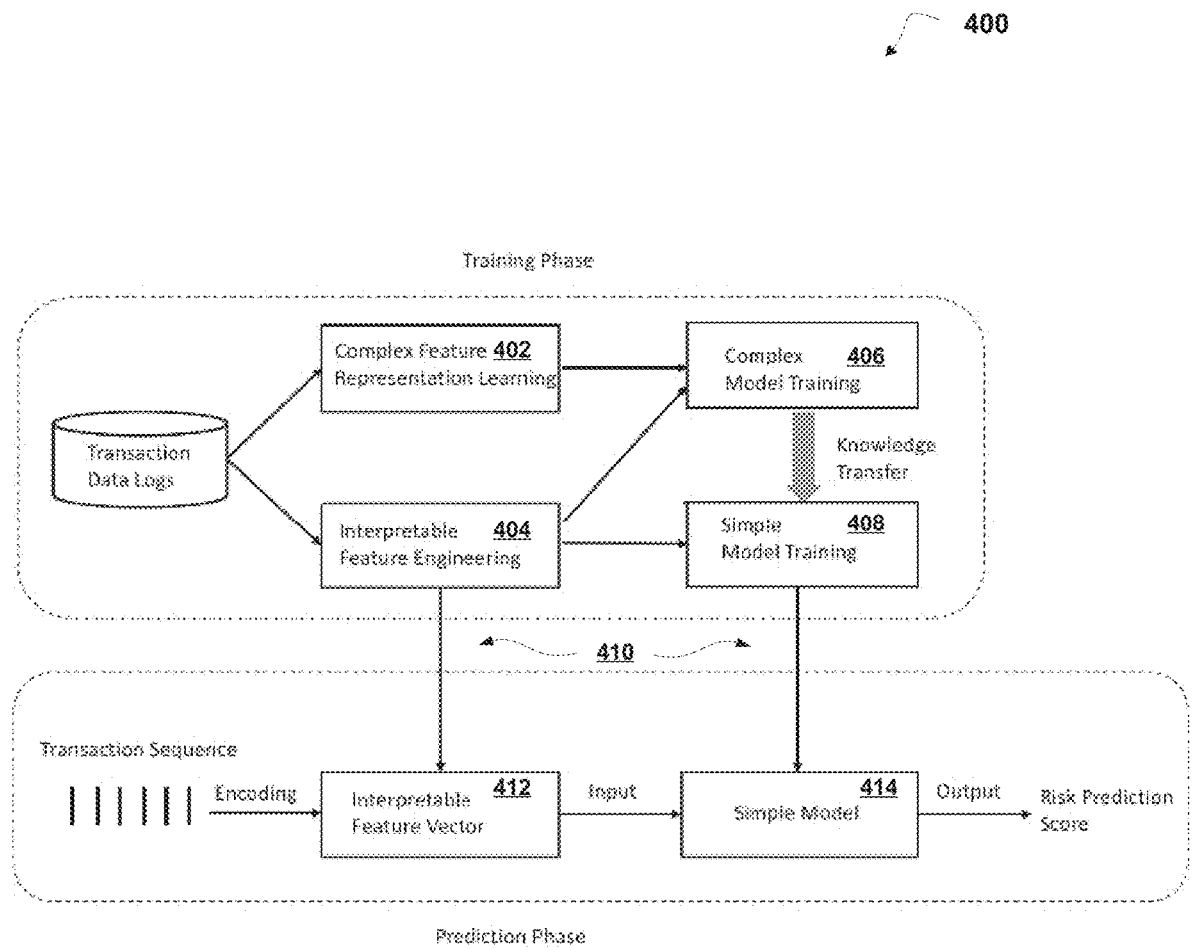
FIG. 4 is a diagram of an implementation of a non-limiting embodiment or aspect of a process for training, providing, and/or using a prediction model that incorporates knowledge from a more complex model disclosed herein.

In some non-limiting embodiments or aspects, transaction service provider system 108 may generate the first training data including the first set of features based on transaction data. For example, and referring also to FIG. 4, which is a diagram of an implementation 400 of a non-limiting embodiment or aspect of a process for training, providing, and/or using a prediction model that incorporates knowledge from a more complex model as described herein, in a training phase, at reference number 402, transaction service provider system 108 may generate the first set of features by applying complex feature representation learning (e.g., as disclosed by Bengio, Y. in the paper titled "Learning Deep Architectures for AI", in Foundations and Trends® in Machine Learning: Vol. 2: No. 1, 2009, pp. 1-127, the entire contents of which is hereby incorporated by reference, as disclosed by Mikolov, T., Sutskever, I., Chen, K., Corrado, G., and Dean J., in the paper titled "Distributed Representations of Words and Phrases and their Compositionality", in Proceedings of the 26th International Conference on Neural Information Processing Systems (NIPS), 2013, pp. 3111-3119, the entire contents of which is hereby incorporated by reference, etc.) to the transaction data. As an example, application of complex feature representation learning to the transaction data can generate complex features from the transaction data. In such an example, the complex features may represent one or more attributes or parameters associated with one or more transactions.

In some non-limiting embodiments or aspects, transaction service provider system 108 may generate the second training data including the second set of features based on transaction data. For example, and referring also to FIG. 4, in the training phase, at reference number 404, transaction service provider system 108 may generate the second set of features by applying one or more existing feature engineering processes to the transaction data. As an example, application of a feature engineering process to the transaction data can generate interpretable features from the transaction data. In such an example, the interpretable features may represent one or more attributes or parameters associated with one or more transactions.

In some non-limiting embodiments or aspects, transaction data includes transaction parameters associated with transactions, such as payment transactions initiated and/or conducted with an electronic wallet application, and/or the like. Non-limiting examples of transaction parameters include: electronic wallet card data, decision data, authorization data, PAN, transaction amount, transaction date and time, conversion rate of currency, merchant type, acquiring institution country, PAN country, response code, merchant name/location, type of currency, and/or the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and/or the like. In some non-limiting embodiments or aspects, transaction data includes a classification label associated with a transaction (e.g., a prior transaction, etc.), such as a true classification label (e.g., a label that indicates that the transaction is associated with fraud, a label that indicates that the transaction is not associated with fraud, labels for sets of positive and negative training examples or samples, etc.).

In some non-limiting embodiments or aspects, electronic wallet card data includes one or more of data associated with an identifier regarding a portable financial device to be provided to an electronic wallet application, data associated with an identifier of an issuer associated with the portable financial device to be provided to an electronic wallet application, data associated with an identifier of a transaction service provider associated with the portable financial device to be provided to an electronic wallet application, data associated with a name of a user associated with the portable financial device to be provided to an electronic wallet application, data associated with an account identifier of an account associated with the portable financial device to be provided to an electronic wallet application, and/or the like.

As shown in FIG. 3, at step 304, process 300 includes training a first model based on first training data and second training data. For example, transaction service provider system 108 may train a first model based on the first training data and the second training data. As an example, transaction service provider system 108 may train a first model (e.g., a more complex model, a teacher model, etc.) based on the first training data and the second training data.

In some non-limiting embodiments or aspects, the first model includes a greater number of parameters than the second model (e.g., the first model includes a more complex model than the second model, etc.). For example, and referring also to FIG. 4, in the training phase, at reference number 406, transaction service provider system 108 may train a more complex model on the complex features and the interpretable features. In such an example, transaction service provider system 108 may train the more complex model with true classification labels for transactions (e.g., prior transactions, etc.) represented by the complex features and the interpretable features.

In some non-limiting embodiments or aspects, the first model includes at least one of the following: a deep neural network, a recurrent neural network, an ensemble of a plurality of neural networks, or any combination thereof. For example, the first model may include a recurrent neural network model including a plurality of long short-term memory (LSTM) layers (e.g., two LSTM layers, etc.), and each LSTM layer may include a plurality of hidden nodes (e.g., each LSTM layer may include 256 hidden nodes, etc.).

As shown in FIG. 3, at step 306, process 300 includes training a second model, using a loss function that depends on an output of an intermediate layer of a first model and an output of the second model, based on second training data. For example, transaction service provider system 108 may train a second model, using a loss function that depends on an output of an intermediate layer of the first model and an output of the second model, based on the second training data. As an example, transaction service provider system 108 may train a second model (e.g., a simpler model, a student model, etc.), using a loss function that depends on an output of an intermediate layer of the first model and an output of the second model, based on the second training data.

In some non-limiting embodiments or aspects, an intermediate layer includes a hidden layer of a neural network. For example, the output of the intermediate layer of the first model may include an output provided directly from a hidden layer of a neural network of the first model. As an example, the output of the intermediate layer of the first model may include a hidden state vector. In such an example, an intermediate layer may be located between an input layer and an output or final layer of a neural network. In some non-limiting embodiments or aspects, an output or final layer of a neural network may include a classification layer (e.g., a softmax layer, etc.), a logits layer, a final or last neuron layer of the neural network, and/or the like.

In some non-limiting embodiments or aspects, the second model is trained using only the second training data, with knowledge learned from the first model. For example, and referring also to FIG. 4, in the training phase, at reference number 408, transaction service provider system 108 may train a simpler model using only the interpretable features, with knowledge learned from the more complex model.

In some non-limiting embodiments or aspects, the second model includes at least one first layer and at least one second layer. In some non-limiting embodiments or aspects, the first layer of the second model includes a regression neural network, and the second layer of the second model includes a logistic regression model. For example, transaction service provider system 108 may use a simple regression neural network model to learn to match the output from the intermediate layer of the more complex model. As an example, an intermediate layer of a more complex model may have a much higher dimension than a final layer of the more complex model. In such an example, transaction service provider system 108 may use the regression neural network to produce a feature vector which is used as an input for a logistic regression model, and a combination of the regression neural network and the logistic regression model can form the simpler model.

In some non-limiting embodiments or aspects, transaction service provider system 108 may determine a plurality of information values of a plurality of intermediate layers of the first model and select the intermediate layer from the plurality of intermediate layers based on the plurality of information values. For example, information value is a metric used to rank-order features according to a predictive power of the features. As an example, a larger information value for a feature may indicate a more predictive feature, and a smaller information value for a feature may indicate a less predictive feature. In such an example, each hidden state of the first model (e.g., the more complex model, the teacher model, etc.) can be viewed as a feature and divided into M categories or buckets, and information value IV can be calculated according to the following Equation (1):

$$IV(x) = \sum_{i=1}^{M} \left[ \left( \frac{F_i}{F} - \frac{NF_i}{NF} \right) \log\left( \frac{F_i/F}{NF_i/NF} \right) \right] \quad (1)$$

In Equation (1), $F_i$ and $NF_i$ are the number of frauds and non-frauds in category i, respectively, and $F=\Sigma_{i=1}^{M} F_i$ and $NF=\Sigma_{i=1}^{M} NF_i$ are the number of frauds and non-frauds in the whole population, respectively. It is noted that IV is non-negative and is zero if and only if $F_i/F$ and $NF_i/NF$ are identical for i=1, 2, . . . , M.

In some non-limiting embodiments or aspects, the first model may include a recurrent neural network model including two LSTM hidden layers. For example, and referring to FIGS. 5A and 5B, which show an implementation 500 of a non-limiting embodiment or aspect for determining information values of a process for training, providing, and/or using a prediction model that incorporates knowledge from a more complex model disclosed herein, upper LSTM layer hidden states from the recurrent neural network model may be used as the target for training of the second model because the upper LSTM layer hidden states are more predictive than other network states in the recurrent neural network model as measured by information value. As an example, such a recurrent neural network model including two LSTM hidden layers may be fairly complex, while offering a substantially significant performance increase over a simpler baseline model. For example, as shown in FIG. 5B, which shows the information values for the cell states and hidden states in the two LSTM layers, the upper-layer LSTM states have higher IV values than the lower-layer LSTM states, which indicates that the upper-layer LSTM network states should have more predictive power. However, non-limiting embodiments or aspects are not limited to a first model that includes such a recurrent neural network model including two LSTM hidden layers, and the first model may include more complex models (e.g., an ensemble of multiple recurrent neural networks, etc.) to provide a stronger teacher model.

In some non-limiting embodiments or aspects, the output of the second model includes an output of the at least one first layer, and training the second model further includes modifying, using the loss function that depends on the output of the intermediate layer of the first model and the output of the second model including the output of the first layer, one or more parameters of the at least one first layer of the second model. For example, transaction service provider system 108 may extract a vector from the intermediate layer of the first model to serve as a target for the first layer of the second model. As an example, transaction service provider system 108 may train the first layer of the second model by optimizing the loss function (e.g., an L2 loss, etc.) between the output of the first layer of the second model and the vector output from the intermediate layer of the first model.

Figure 5A:
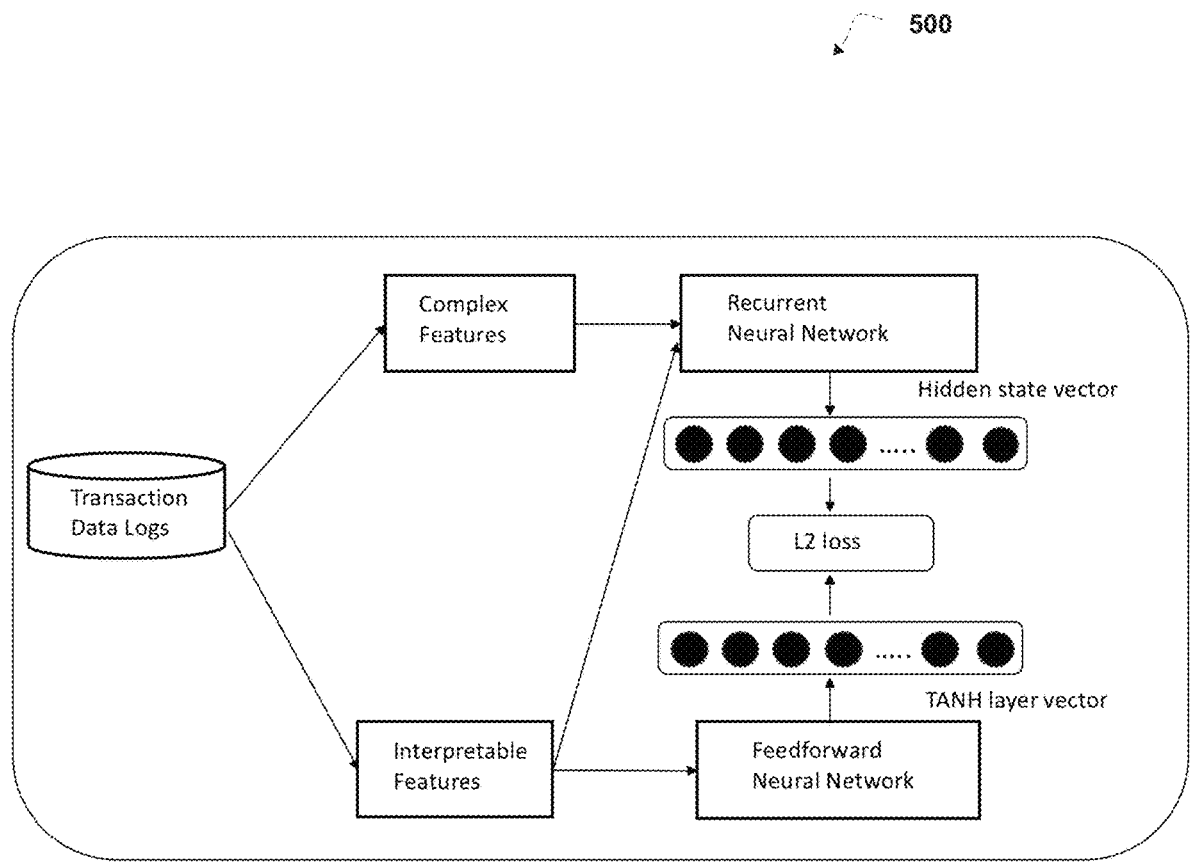
FIG. 5A is a diagram of an implementation of a non-limiting embodiment or aspect of a process for training, providing, and/or using a prediction model that incorporates knowledge from a more complex model disclosed herein.
Figure 5B:
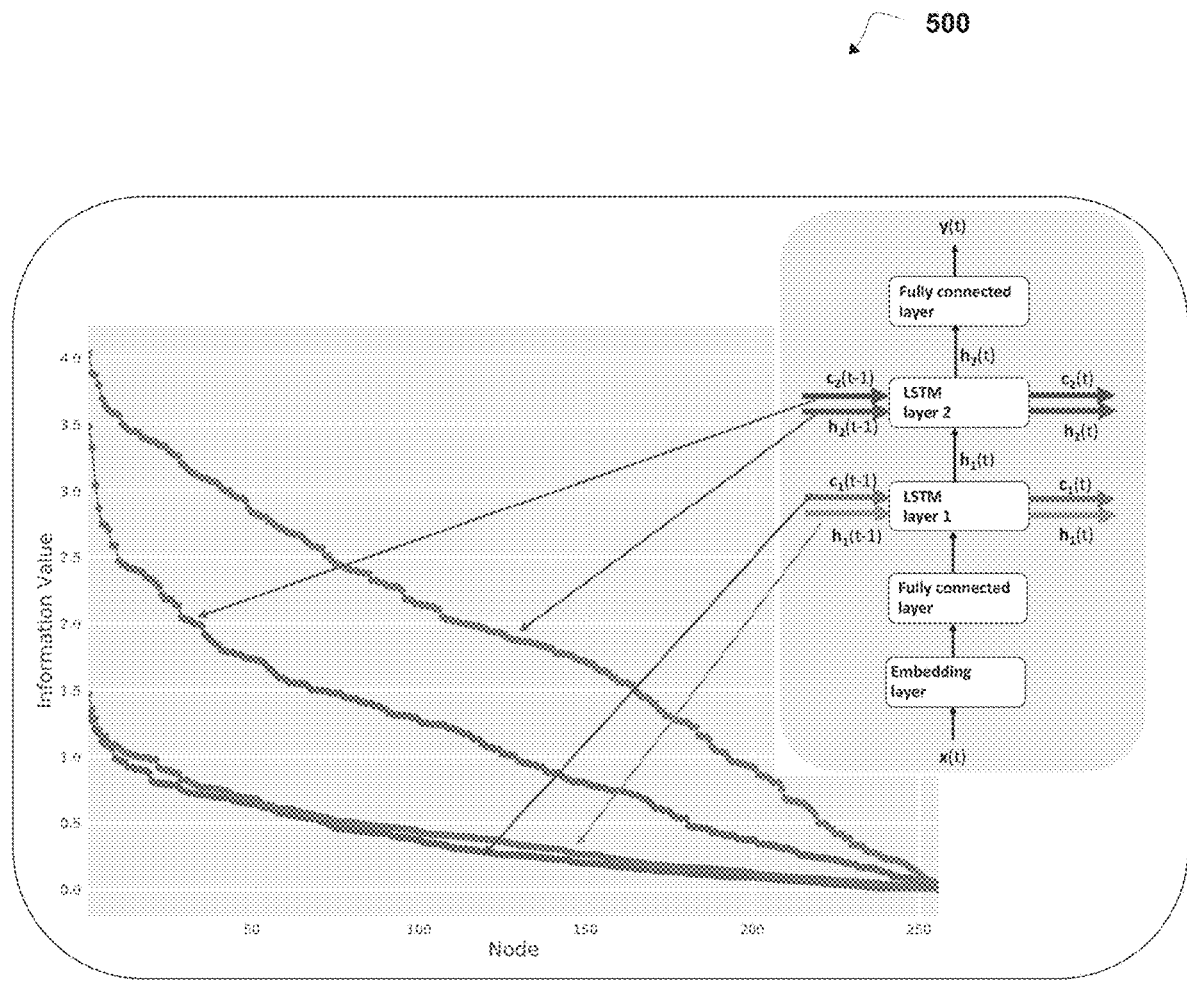
FIG. 5B is a graph of information values for an implementation of a non-limiting embodiment or aspect of a process for training, providing, and/or using a prediction model that incorporates knowledge from a more complex model as shown in FIG. 5A.

As shown in FIG. 5A, the first model may include the recurrent neural network model including two LSTM hidden layers each with 256 hidden nodes. As an example, transaction service provider system 108 may extract the hidden state vector, denoted as h(t) in Equation (2) below, from the second LSTM layer of the recurrent neural network, which is a 256-dimensional vector that serves as the target for training the second model, which may include the feedforward regression neural network with one-hidden layer, denoted as FRNN in Equation (2) below. In such an example, the second model may be trained by minimizing the L2 loss between the output of the second model and the 256-dimensional target vector from the first model according to the following Equation (2):

$$\mathcal{L}(W_1, W_2) = \frac{1}{2N} \sum_{t=1}^{N} \|FRNN(x(t); W_1, W_2) - h(t)\|_2^2 \quad (2)$$

In Equation (2), $W_1$ is the weight matrix between the input feature vector x and the hidden layer of the regression neural network, $W_2$ is the weight matrix between the hidden layer to target units, and N is the number of training examples. The parameters $W_1$ and $W_2$ may be updated using a standard back-propagation algorithm with momentum terms. Still referring to FIG. 5A, the hidden state vector h(t) from the recurrent neural network is bounded between −1 and 1 because the hidden state vector h(t) is calculated as h(t)=o (t)⊙tanh(c(t)), where o(t) is the output from the output gate in the recurrent neural network which has a value from 0 to 1, and c(t) is the cell status which is unbounded. The operation ⊙ denotes the element-wise product, e.g., a TANH layer vector, may be used as an activation function in the regression neural network model to ensure the output from the second model has a value between −1 and 1. Once trained, the parameters of the regression neural network may be fixed. For each training example x(t), the regression neural network may produce a feature vector, which may be used as input for a logistic regression model.

In some non-limiting embodiments or aspects, training the second model further includes training the at least one second layer based on the output of the at least one first layer. For example, transaction service provider system 108 may train the second layer of the second model with inputs from the first layer of the second model with the true classification labels (e.g., with positive and negative examples or samples, etc.) for transactions (e.g., prior transactions, etc.) in transaction data logs or a database. As an example, the logistic regression model may be trained with inputs (e.g., the feature vectors, etc.) output from the regression neural network model with the true classification labels for the transaction in the transaction data logs or the database.

As shown in FIG. 3, at step 308, process 300 includes providing a trained second model. For example, transaction service provider system 108 may provide the trained second model. As an example, transaction service provider system 108 may provide the trained second model (e.g., the trained simpler model, the trained student model, etc.) for use at merchant system 102, payment gateway 104, acquirer system 106, transaction service provider system 108, issuer system 110, and/or user device 112 (e.g., via communication network 114). In such an example, the trained second model may include a layered model including the regression neural network as a first layer and the logistic regression model as a second layer.

In some non-limiting embodiments or aspects, transaction service provider system 108 provides the interpretable features (e.g., one or more feature engineering processes or functions for generating the interpretable features based on transaction data, etc.) with the trained second model. For example, and referring also to FIG. 4, at reference number 410, transaction service provider system 108 provides (e.g., stores, transmits, etc.) the interpretable features (e.g., one or more feature engineering processes or functions for generating the interpretable features based on transaction data, etc.) with the trained second model (e.g., the trained simpler model, etc.).

As shown in FIG. 3, at step 310, process 300 includes obtaining input data. For example, transaction service provider system 108 may obtain input data. As an example, transaction service provider system 108 may obtain input data associated with at least one transaction.

In some non-limiting embodiments or aspects, transaction service provider system 108 may generate the input data based on transaction data. For example, and referring also to FIG. 4, in a predictive phase, at reference number 410, transaction service provider system 108 may generate interpretable features associated with the at least one transaction by applying the one or more existing feature engineering processes to transaction data associated with the at least one transaction. As an example, when a new transaction is received in transaction processing network 101, transaction service provider system 108 may generate interpretable features associated with the new transaction for input to the trained second model (e.g., the trained simpler model, etc.).

As shown in FIG. 3, at step 312, process 300 includes processing input data using a trained second model to generate output data. For example, transaction service provider system 108 may process the input data using the trained second model to generate output data. As an example, transaction service provider system 108 may process the input data using the trained second model to generate output data (e.g., a prediction, a probability, a certainty, a likelihood, a percentage, a binary output, a yes-no output, etc.).

In some non-limiting embodiments or aspects, output data includes a prediction (e.g., a risk prediction score, etc.) of whether the at least one transaction is a fraudulent transaction. For example, transaction service provider system 108 can determine a probability (e.g., a certainty, a likelihood, a percentage, a binary output, a yes-no output, etc.) that the at least one transaction is a fraudulent transaction by processing the input data using the trained second model to generate the output data including the prediction. As an example, transaction service provider system 108 generates the probability that the at least one transaction is a fraudulent transaction by receiving, as input to the trained second model, the input data associated with the at least one transaction and, providing, as an output from the trained second model, the probability that the at least one transaction is a fraudulent transaction.

In some non-limiting embodiments or aspects, transaction service provider system 108 may generate the output data using only the interpretable features associated with the new transaction. For example, and referring also to FIG. 4, in the predictive phase, at reference number 412, transaction service provider system 108 may generate a prediction of whether the new transaction is a fraudulent transaction by receiving as input, to the simpler model, the interpretable features (e.g., an interpretable feature vector, etc.) associated with the new transaction, and providing as output, from the simpler model a risk prediction score including a probability (e.g., a certainty, a likelihood, a percentage, a binary output, a yes-no output, etc.) that the new transaction is a fraudulent transaction at reference number 414.

Table 1 below provides a comparison of performance results for implementation 500 to a baseline model. For example, Table 1 shows the performance of a teacher model including the recurrent neural network model with two LSTM layers each with 256 hidden nodes as described herein with respect to implementation 500, a student model including the regression neural network as a first layer and the logistic regression model as a second layer as described with respect to implementation 500, and a baseline model including a simple neural network model with the same parameters as the student model without knowledge transfer from the teacher model, measured by area-under-curve (AUC). As an example, the higher the AUC value, the better the performance of the model.

TABLE 1

| Model | AUC |
|---|---|
| Teacher | 0.961 |
| Student | 0.944 |
| Baseline | 0.931 |

In such an example, the teacher model may include about 1.8 million parameters, the student model may include about 290K parameters. Accordingly, the teacher model may be considered merely a fairly complex model, but such a fairly complex model is sufficient to show a performance increase that can be provided by non-limiting embodiments or aspects of a process for training, providing, and/or using a prediction model that incorporates knowledge from a more complex model. For example, the complexity of the teacher model may be increased (e.g., by using an ensemble of a set of models, etc.) to boost the generalization ability of the teacher for training the student model. In such an example, the teacher model may be trained offline because the teacher model may not operate in real-time, which enables the teacher model to use larger data sets and a greater amount of computation resources. For example, the complexity of the teacher model may be unbounded due to the decoupling of model training and model deployment, which enables employing much more complex models with numerous capacity and strong generalization ability as teacher models for transferring knowledge to student models that can be easily deployed in existing system architectures for use in real-time predictions (e.g., for use in real-time fraud predictions during receipt and/or processing of new transactions in transaction processing network 101, etc.).

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects; but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:
obtaining, with at least one processor, first training data associated with a first set of features and second training data associated with a second set of features different than the first set of features, wherein each of the first set of features and the second set of features is associated with a same plurality of transactions and a same plurality of labels for the same plurality of transactions;
training, with at least one processor, a first model based on the first training data, the second training data, and the same plurality of labels; and
training, with at least one processor, a second model, using a loss function that depends on an output of an intermediate layer of the first model and an output of the second model, based on the second training data, wherein the second model includes at least one first layer and at least one second layer, wherein the output of the second model includes an output of the at least one first layer, and wherein training the second model further comprises:
providing, with the at least one processor, as input to the second model, only the second training data;
receiving, with the at least one processor, as output from the second model, the output of the second model;
modifying, using the loss function that depends on the output of the intermediate layer of the first model and the output of the second model including the output of the at least one first layer, one or more parameters of the at least one first layer of the second model to learn to match the output of the intermediate layer of the first model; and
training the at least one second layer based on the output of the at least one first layer and the same plurality of labels,
wherein the first model includes a recurrent neural network that includes two long short-term memory (LSTM) hidden layers including the intermediate layer of the first model, wherein the output of the intermediate layer of the first model includes a hidden state vector h(t) from the second LSTM hidden layer of the two LSTM hidden layers, wherein the second model includes a feedforward regression neural network (FRNN), and wherein the loss function minimizes a squared error (L2) loss between the output of the second model and the output of the intermediate layer of the first model.

2. The computer-implemented method of claim 1, wherein the first model includes at least one of the following: a deep neural network, a recurrent neural network, an ensemble of a plurality of neural networks, or any combination thereof, wherein the first layer of the second model includes a regression neural network, and wherein the second layer of the second model includes a logistic regression model.

3. The computer-implemented method of claim 1, further comprising:
determining, with at least one processor, a plurality of information values of a plurality of intermediate layers of the first model; and
selecting, with at least one processor, the intermediate layer from the plurality of intermediate layers based on the plurality of information values.

4. The computer-implemented method of claim 1, wherein the first set of features includes complex features, and wherein the second set of features includes interpretable features.

5. The computer-implemented method of claim 1, wherein the first model includes a greater number of parameters than the second model.

6. The computer-implemented method of claim 1, further comprising:
providing, with at least one processor, the trained second model;
obtaining, with at least one processor, input data associated with at least one transaction; and
processing, with at least one processor and using the trained second model, the input data to generate output data, wherein the output data includes a prediction of whether the at least one transaction is a fraudulent transaction.

7. A computing system comprising:
at least one processor programmed and/or configured to:
obtain first training data associated with a first set of features and second training data associated with a second set of features different than the first set of features, wherein each of the first set of features and the second set of features is associated with a same plurality of transactions and a same plurality of labels for the same plurality of transactions;
train a first model based on the first training data, the second training data, and the same plurality of labels; and
train a second model, using a loss function that depends on an output of an intermediate layer of the first model and an output of the second model, based on the second training data,
wherein the second model includes at least one first layer and at least one second layer, wherein the output of the second model includes an output of the at least one first layer, and wherein the at least one processor further trains the second model by:
providing, as input to the second model, only the second training data;
receiving, as output from the second model, the output of the second model;
modifying, using the loss function that depends on the output of the intermediate layer of the first model and the output of the second model including the output of the at least one first layer, one or more parameters of the at least one first layer of the second model to learn to match the output of the intermediate layer of the first model; and
training the at least one second layer based on the output of the at least one first layer and the same plurality of labels,
wherein the first model includes a recurrent neural network that includes two long short-term memory (LSTM) hidden layers including the intermediate layer of the first model, wherein the output of the intermediate layer of the first model includes a hidden state vector h(t) from the second LSTM hidden layer of the two LSTM hidden layers, wherein the second model includes a feedforward regression neural network (FRNN), and wherein the loss function minimizes a squared error (L2) loss between the output of the second model and the output of the intermediate layer of the first model.

8. The computing system of claim 7, wherein the first model includes at least one of the following: a deep neural network, a recurrent neural network, an ensemble of a plurality of neural networks, or any combination thereof, wherein the first layer of the second model includes a regression neural network, and wherein the second layer of the second model includes a logistic regression model.

9. The computing system of claim 7, wherein the at least one processor is further programmed and/or configured to:
determine a plurality of information values of a plurality of intermediate layers of the first model; and
select the intermediate layer from the plurality of intermediate layers based on the plurality of information values.

10. The computing system of claim 7, wherein the first set of features includes complex features, and wherein the second set of features includes interpretable features.

11. The computing system of claim 7, wherein the first model includes a greater number of parameters than the second model.

12. The computing system of claim 7, wherein the at least one processor is further programmed and/or configured to:
provide the trained second model;
obtain input data associated with at least one transaction; and
process, using the trained second model, the input data to generate output data, wherein the output data includes a prediction of whether the at least one transaction is a fraudulent transaction.

13. A computer program product comprising at least one non-transitory computer-readable medium including program instructions that, when executed by at least one processor, cause the at least one processor to:
obtain first training data associated with a first set of features and second training data associated with a second set of features different than the first set of features, wherein each of the first set of features and the second set of features is associated with a same plurality of transactions and a same plurality of labels for the same plurality of transactions;
train a first model based on the first training data, the second training data, and the same plurality of labels; and
train a second model, using a loss function that depends on an output of an intermediate layer of the first model and an output of the second model, based on the second training data,
wherein the second model includes at least one first layer and at least one second layer, wherein the output of the second model includes an output of the at least one first layer, and wherein the program instructions, when executed by the at least one processor, further cause the at least one processor to train the second model by:
providing, as input to the second model, only the second training data;
receiving, as output from the second model, the output of the second model;

modifying, using the loss function that depends on the output of the intermediate layer of the first model and the output of the second model including the output of the at least one first layer, one or more parameters of the at least one first layer of the second model to learn to match the output of the intermediate layer of the first model; and training the at least one second layer based on the output of the at least one first layer and the same plurality of labels, wherein the first model includes a recurrent neural network that includes two long short-term memory (LSTM) hidden layers including the intermediate layer of the first model, wherein the output of the intermediate layer of the first model includes a hidden state vector h(t) from the second LSTM hidden layer of the two LSTM hidden layers, wherein the second model includes a feedforward regression neural network (FRNN), and wherein the loss function minimizes a squared error (L2) loss between the output of the second model and the output of the intermediate layer of the first model.

14. The computer program product of claim 13, wherein the instructions further cause the at least one processor to:

determine a plurality of information values of a plurality of intermediate layers of the first model; and select the intermediate layer from the plurality of intermediate layers based on the plurality of information values.

15. The computer program product of claim 13, wherein the first set of features includes complex features, and wherein the second set of features includes interpretable features.

16. The computer program product of claim 13, wherein the first model includes a greater number of parameters than the second model.

17. The computer program product of claim 13, wherein the instructions further cause the at least one processor to:

provide the trained second model;

obtain input data associated with at least one transaction; and process, using the trained second model, the input data to generate output data, wherein the output data includes a prediction of whether the at least one transaction is a fraudulent transaction.

18. The computer-implemented method of claim 1, wherein the second model includes a feedforward regression neural network FRNN, and wherein the loss function minimizes the squared error (L2) loss between the output of the second model and the output of the intermediate layer of the first model according to the following Equation:

$$\mathcal{L}(W_1, W_2) = \frac{1}{2N}\sum_{t=1}^{N}\|FRNN(x(t); W_1, W_2) - h(t)\|_2^2$$

where x(t) is a transaction of the same plurality of transactions, $W_1$ is a weight matrix between an input feature vector x of the transaction x(t) and the at least one first layer of the second model, $W_2$ is a weight matrix between the at least one first layer of the second model to the hidden state vector h(t), and N is a number of the same plurality of transactions.

19. The computing system of claim 7, wherein the loss function minimizes the squared error (L2) loss between the output of the second model and the output of the intermediate layer of the first model according to the following Equation:

$$\mathcal{L}(W_1, W_2) = \frac{1}{2N}\sum_{t=1}^{N}\|FRNN(x(t); W_1, W_2) - h(t)\|_2^2$$

where x(t) is a transaction of the same plurality of transactions, $W_1$ is a weight matrix between an input feature vector x of the transaction x(t) and the at least one first layer of the second model, $W_2$ is a weight matrix between the at least one first layer of the second model to the hidden state vector h(t), and N is a number of the same plurality of transactions.

20. The computer program product of claim 13, wherein the loss function minimizes the squared error (L2) loss between the output of the second model and the output of the intermediate layer of the first model according to the following Equation:

$$\mathcal{L}(W_1, W_2) = \frac{1}{2N}\sum_{t=1}^{N}\|FRNN(x(t); W_1, W_2) - h(t)\|_2^2$$

where x(t) is a transaction of the same plurality of transactions, $W_1$ is a weight matrix between an input feature vector x of the transaction x(t) and the at least one first layer of the second model, $W_2$ is a weight matrix between the at least one first layer of the second model to the hidden state vector h(t), and N is a number of the same plurality of transactions.

* * * * *

UNITED STATES PATENT AND TRADEMARK OFFICE
CERTIFICATE OF CORRECTION

PATENT NO. : 12,039,458 B2
APPLICATION NO. : 16/244240
DATED : July 16, 2024
INVENTOR(S) : Liang Wang et al.

It is certified that error appears in the above-identified patent and that said Letters Patent is hereby corrected as shown below:

In the Claims

Column 27, Lines 47-48, Claim 18, after "claim 1," delete "wherein the second model includes a feedforward regression neural network FRNN, and wherein" and insert -- wherein --

Signed and Sealed this
First Day of October, 2024

Katherine Kelly Vidal
*Director of the United States Patent and Trademark Office*